Nov. 5, 1935.   A. MAHANNAH   2,019,789
ADJUSTABLE SUPPORT FOR CLAMPS
Filed April 12, 1935
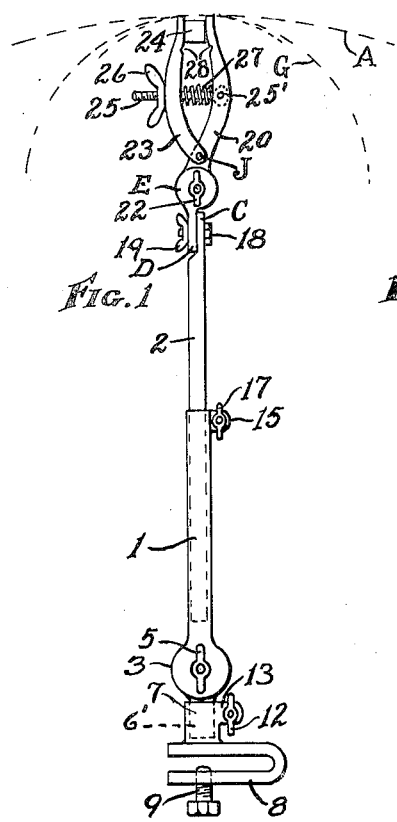
Fig. 1
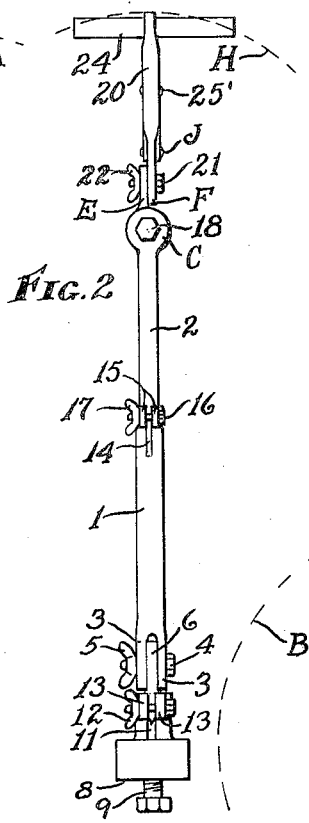
Fig. 2
Fig. 3
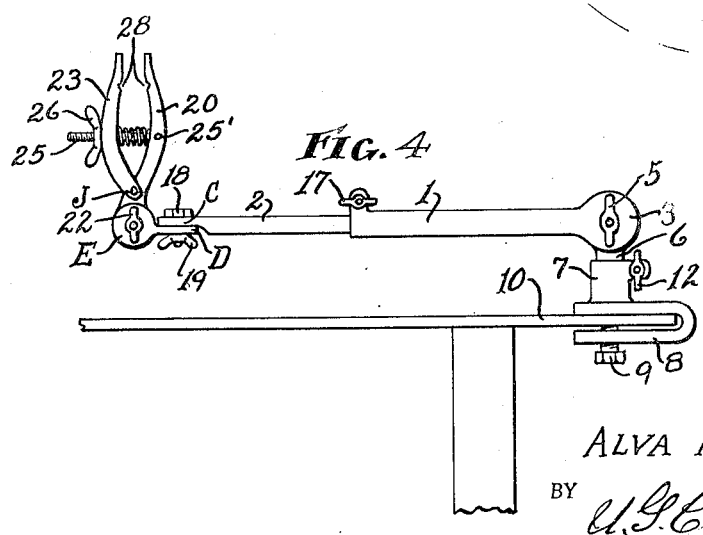
Fig. 4
INVENTOR.
ALVA MAHANNAH
BY *U. G. Charles*
ATTORNEY.

Patented Nov. 5, 1935

2,019,789

UNITED STATES PATENT OFFICE 2,019,789

ADJUSTABLE SUPPORT FOR CLAMPS

Alva Mahannah, Sedgwick, Kans.

Application April 12, 1935, Serial No. 16,000

2 Claims. (Cl. 113—99)

My invention relates to an adjustable support for clamps.

The object of my invention is to provide a telescopically arranged arm with universal joints at each end thereof, and means to secure one end of the mechanism to a bench, the other end having a clamp adjustably connected.

A further object of my invention is to provide a support arm with a plurality of joints at each end thereof, one set removably secured to the top of a bench and the other set having a clamp attached to rock and turn to any desirable position.

A still further object of my invention is to provide a clamp adjustably carried in working position on a bench so that a rod or other metallic element may be secured in the clamp for welding the same to another like element by a mechanic while operating a welding torch.

A still further object of my invention is to provide a clamp rockably carried by an arm, telescopically arranged to vary the length and having joints to rock and move the clamp at a desired position for the convenience of the operator while working upon an object secured in the clamp, and means to secure all jointed features rigidly when properly positioned.

These and other objects will hereinafter be more fully explained, reference being had to the accompanying drawing, forming a part of this specification, and in which like characters will apply to like parts in the different views.

Referring to the drawing:

Fig. 1 is a side view of the mechanism positioned erect.

Fig. 2 is a transversed view of Fig. 1.

Fig. 3 is a plan view with the clamp turned to a horizontal plane.

Fig. 4 is a side view showing the mechanism secured to the top of a bench and rocked to one position.

The invention herein disclosed consists of an adjustable arm comprising a sleeve 1 and a rod 2 insertable in the sleeve and arranged telescopically in its movement; on the lower extremity of the sleeve 1, is a bifurcation, each leg thereof being a disc-like structure 3, centrally apertured to receive a bolt having a head 4, to bear on one leg of the bifurcation, and a wing nut 5 to threadedly engage on the other end of the bolt, as means to tension the said legs toward each other, as clamping means to an apertured disc 6, positioned therebetween and upon which the said arm will rock as indicated by dotted line A. The last said disc 6 is integrally joined to a pin 6' shown by dotted lines in Fig. 1, the said pin adapted to seat in the bore of a stud 7, that is integrally joined to one leg of a U shaped member 8, the other leg being apertured and threaded to receive a threaded set screw 9, as securing means for the said U shaped member to a bench top 10, or the like, as shown in Fig. 4. The said stud 7, being split as at 11, will permit flexing through the medium of a bolt and wing nut 12 positioned in the aperture of an ear 13, on each side of the split, as shown in Fig. 2, when the said nut is turned to secure or release the said pin, when the latter is to be removed or turned in either direction as indicated by dotted line B in Fig. 3 for the purpose later described.

Longitudinally extending in the upper end of the said sleeve is a slot 14 as flexing means to bind the said end portion to rod 2 positioned therein, and to cause the binding function, there is placed on each side of the slot an ear 15 centrally apertured to receive a bolt 16 and winged nut 17 threadedly engaging thereon as tensioning means to contract the end of the sleeve 1 when a rigid position is desired, and when released the said member and parts connected therewith are free to turn or move longitudinally to and from the sleeve.

Formed on the upper end of the said rod 2 is an apertured disc C offset to one side of said rod to receive a similar disc D, rockably engaging thereon through the medium of a bolt 18, having a wing nut 19 threadedly engaging thereon as securing means for the said disc to firm engagement when turned to a predetermined slant for another disc E integral therewith but transversely positioned thereto, and to which is rockably secured a disc F integral with a jaw 20 of a clamping device. The said clamping device is rockable in either direction as shown by dotted lines G, and secured at a desired position when discs E and F are clamped together by a bolt 21, through the medium of a wing nut 22, threadedly engaging on said bolt, by which means the said clamp may be rocked transversely as shown by dotted line H, the arc of which centers on bolt 18. In other words, a universal joint is arranged to rock the said clamp in any direction.

Pivotally attached as at J is another jaw 23, similar in arcuate form to the first said jaw and arranged so that the outer ends thereof will move to and from each other, and secured to a clamping engagement with a rod 24 or the like, through the medium of a threaded bolt 25, one end of which is pivoted as at 25' to jaw 20, and extending through an aperture of the other jaw with a wing nut 26 threadedly engaging thereon to move said jaws together, and to separate the same, there is wound on the said bolt 25 a spring 27, as outward moving means for the jaws; on the outer end of each jaw, on the inside thereof is a notch 28 functioning as a seat in which to grip a round rod or the like to avoid turning thereof.

It is now clearly shown that an element carried by the jaws may be turned or rocked in any direction and moved telescopically to the convenience of the operator for welding, trimming, or otherwise finishing the article being worked upon, and all jointed means provide for rigid engagement are tensioned to flex through the medium of the various tightening means, and while it is shown to be a mechanism of considerable length, the same may be reduced, and such other modification may be employed as lie within the scope of the appended claims.

Having fully described my invention, what I claim as new and desire to secure by Letters Patent is:

1. In an adjustable support for clamps, of the class described comprising a U shaped member having a stud integrally joined to one leg, the stud being axially bored, the other leg being apertured and threaded in axial alignment with the stud, to engage a set screw as securing means for the said U shaped member to a stationary support, a clamp comprising a pair of jaws pivotally connected at their corresponding ends, the free ends of the jaws adapted to contact in parallelism for a short distance and each having a notch adjacent the inward terminating point of each parallel portion, means to move the free ends to and from each other, a rod and a sleeve telescopingly engaging, the rod being adapted to turn in the sleeve and means to rigidly secure said rod and sleeve together, a universal jointed means connecting the jaws to the outer end of the rod and means to rigidly secure the joints, a pin pivotally connected to the outer end of the sleeve for rocking movement and means to secure the same against movement, the said pin being adapted to engage in the bore of the stud and adapted to turn in the same and means to bind the stud rigid to the pin.

2. In an adjustable support for clamps, of the class described comprising, a studded member, the stud being axially bored and means to secure the said studded member to a stationary support, a clamp comprising a pair of jaws pivotally connected at their corresponding ends, the free ends of the jaws adapted to contact in parallelism for a short distance and each having a notch adjacent the inward terminating point of each parallel portion, means to move the free ends to and from each other, a rod and a sleeve telescopingly engaging, the rod being adapted to turn in the sleeve and means to rigidly secure said rod and sleeve together, a universal jointed means connecting the jaws to the outer end of the rod and means to rigidly secure the joints, a pin pivotally connected to the outer end of the sleeve for rocking movement and means to secure the same against movement, the said pin being adapted to engage in the bore of the stud and adapted to turn in the same, and means to bind the stud rigid to the pin.

ALVA MAHANNAH.